United States Patent [19]

Kaneko

[11] Patent Number: 4,821,221

[45] Date of Patent: Apr. 11, 1989

[54] COMPUTER TERMINAL DEVICE FOR PRODUCING DIFFERENT TYPES OF BUZZER SOUNDS

[75] Inventor: Masahiko Kaneko, Kawagoe, Japan

[73] Assignee: Citizen Watch Co., Ltd., Tokyo, Japan

[21] Appl. No.: 740,207

[22] Filed: May 31, 1985

[30] Foreign Application Priority Data

Jun. 4, 1984 [JP] Japan .................. 59-113018

[51] Int. Cl.$^4$ .................. G06F 3/16; G10L 5/02
[52] U.S. Cl. .................. 364/710.13; 381/51; 364/710.12
[58] Field of Search .................. 364/710, 513.5, 405, 364/200 MS File, 900 MS File; 381/51; 340/384 E

[56] References Cited

U.S. PATENT DOCUMENTS

| | | | |
|---|---|---|---|
| 4,179,584 | 12/1979 | Tanimoto et al. | 364/710 |
| 4,185,169 | 1/1980 | Tanimoto et al. | 364/710 |
| 4,211,892 | 7/1980 | Tanimoto et al. | 381/51 |
| 4,354,246 | 10/1982 | Fujisawa | 364/709 |
| 4,429,367 | 1/1984 | Ikeda | 381/51 |
| 4,431,866 | 2/1984 | Toyomura | 381/51 |
| 4,500,971 | 2/1985 | Futaki et al. | 364/513.5 |
| 4,516,200 | 5/1985 | Thompson | 364/200 |
| 4,630,222 | 12/1986 | Yoshida et al. | 381/51 |
| 4,653,100 | 3/1987 | Barnett et al. | 381/52 |

Primary Examiner—Gary V. Harkcom
Assistant Examiner—Tan V. Mai
Attorney, Agent, or Firm—Lowe, Price, LeBlanc, Becker & Shur

[57] ABSTRACT

A plurality of buzzer sound data obtained by converting different types of intermittent buzzer sounds to numerical values is stored in a buzzer source data memory. Coded data received from a host apparatus by a receiver is decoded by a receiver. A decoding result is stored in an index register. The buzzer sound data is read out from the buzzer sound data memory in response to the decoding result data in accordance with the instruction supplied from the host apparatus through a readout. The intermittent buzzer sounds corresponding to the readout buzzer sound data are produced by a buzzer unit.

4 Claims, 3 Drawing Sheets

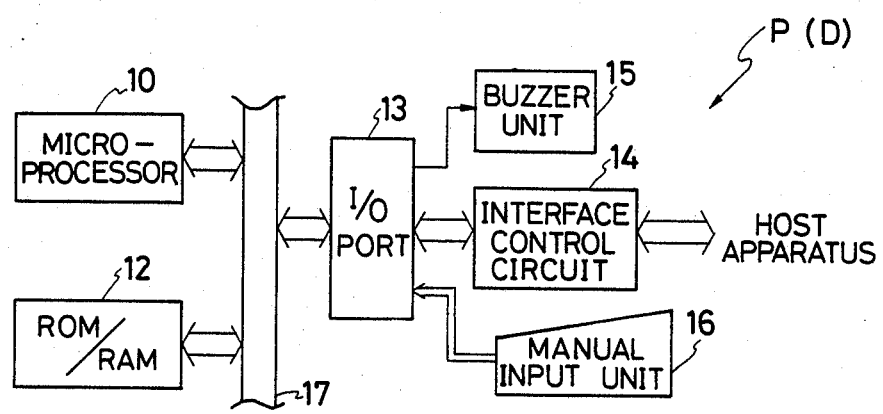

FIG.5

| ADDRESS | +0 | +1 | +2 | +3 | +4 | +5 | +6 | +7 | +8 .... |
|---|---|---|---|---|---|---|---|---|---|
| DT 0 | 1 | 4 | 0 | | | | | | |
| DT 1 | 1 | 2 | 1 | 2 | 1 | 2 | 0 | | |
| DT 2 | 1 | 4 | 1 | 2 | 1 | 2 | 1 | 2 | ·········· 0 |
| DT 3 | 1 | 2 | 1 | 4 | 1 | 2 | 1 | 2 | ·········· 0 |
| DT 4 | 1 | 1 | 1 | 3 | 0 | | | | |
| DT 5 | 1 | 3 | 1 | 1 | 1 | 1 | 1 | 1 | 0 |
| DT 6 | 1 | 3 | 1 | 1 | 1 | 3 | 1 | 1 | 0 |
| ⋮ | ⋮ | ⋮ | ⋮ | ⋮ | ⋮ | ⋮ | ⋮ | ⋮ | ⋮ |
| DT n | | | | | | | | | |

COMPUTER TERMINAL DEVICE FOR PRODUCING DIFFERENT TYPES OF BUZZER SOUNDS

BACKGROUND OF THE INVENTION

1. Field of the Invention

The present invention relates to a computer terminal device such as a printer or a CRT connected to a host apparatus such as a host computer and, more particularly, to a computer terminal device for producing different types of buzzer sounds.

A conventional computer terminal device such as a printer for generating buzzer sounds is known:

(1) to acknowledge to an operator that an error or the like has occurred;

(2) to allow the operator to check an input entered with an operation switch or the like; and (3) to call the operator in response to a specific command transmitted from a host apparatus.

When the buzzer sound is generated in response to the special command in item (3) above to call the operator, however, only one type of buzzer sound is generated in the conventional computer terminal device although there may be several reasons for calling the operator. As a result, a specific reason for calling the operator cannot be discriminated by the buzzer sound.

SUMMARY OF THE INVENTION

It is an object of the present invention to provide a computer terminal device such as a printer or a CRT, wherein different buzzer sounds can be generated in accordance with corresponding types of input data, so that the operator can discriminate a specific reason he was called each time a buzzer sound is generated.

It is another object of the present invention to provide a computer terminal device such as a printer or a CRT wherein a buzzer sound is generated in one-to-one correspondence with input data representing a character.

According to the present invention, there is provided a computer terminal device for generating different types of buzzer sounds, said computer terminal device comprising buzzer sound data memory for storing a plurality of buzzer sound data which are obtained by converting different types of intermittent buzzer sounds to numeric values, each buzzer sound data representing a corresponding one of the different types of intermittent buzzer sounds. The computer terminal device comprises a receiver for receiving coded data from the host apparatus, a data discriminator means for decoding the coded data received by the receiver, and an index register for storing data representing a decoding result of the data discriminator means. The computer terminal device further has a buzzer sound readout and a buzzer unit. The readout reads out the buzzer tone data corresponding to the data representing the decoding result from the buzzer sound data memory in response to an instruction supplied from the host apparatus. The intermittent buzzer sound corresponding to the readout buzzer sound data is produced by the buzzer unit.

The above and other objects, features and advantages of the present invention will be apparent from the following detailed description taken in conjunction with the accompanying drawings.

BRIEF DESCRIPTION OF THE DRAWINGS

FIG. 1 is a schematic block diagram showing a computer terminal device according to an embodiment of the present invention;

FIG. 2 is an address table stored in a memory in FIG. 1; 15 FIG. 3 is a buzzer data able;

FIG. 5 is a buzzer data table used for generating a Morse signal.

DETAILED DESCRIPTION OF THE PREFERRED EMBODIMENT

Figure 4:
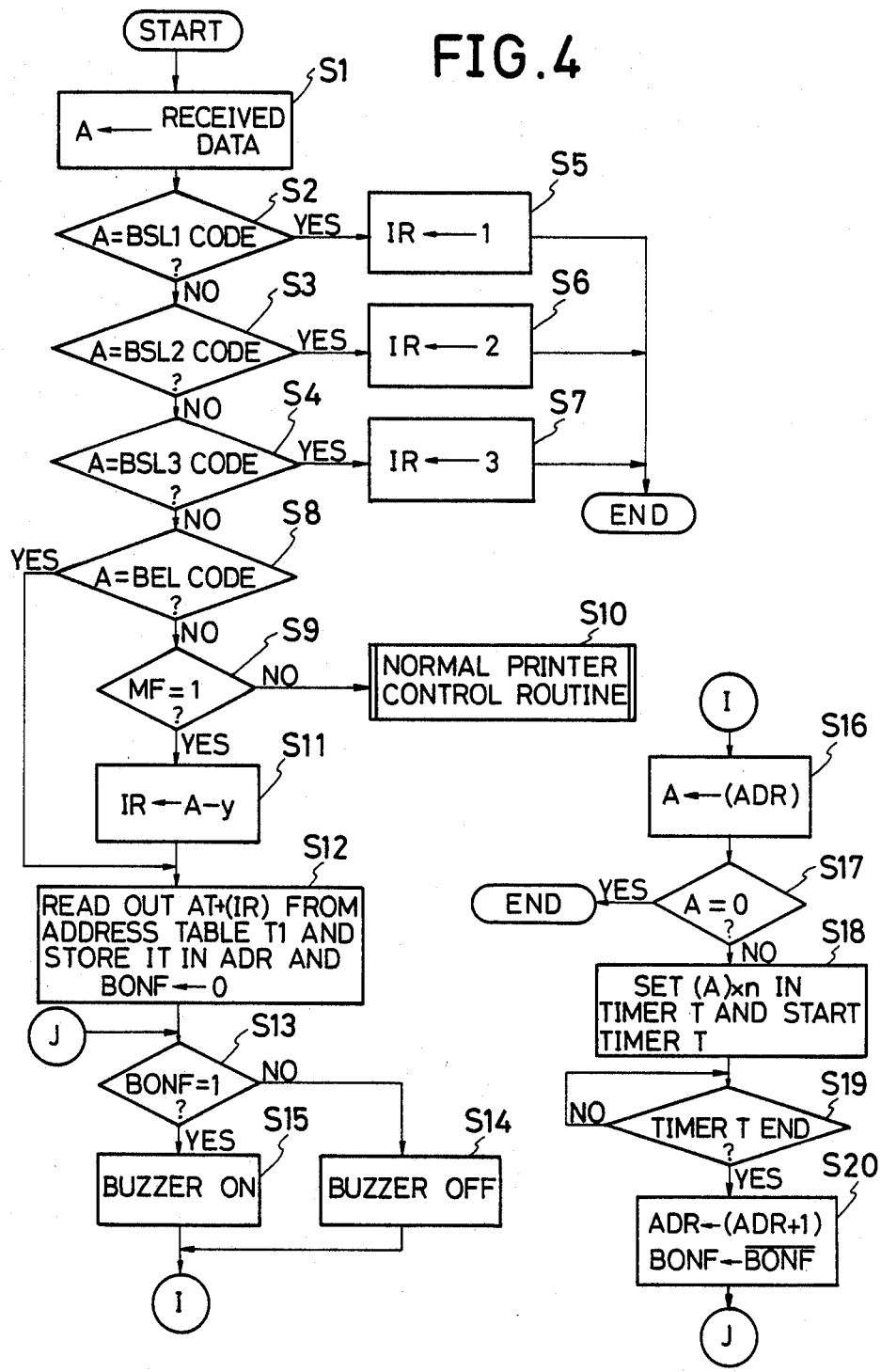
FIG. 4 is a flow chart of a control program executed in a microprocessor of FIG. 1.

FIG. 1 shows the main part of a computer terminal device such as a printer according to an embodiment of the present invention. Referring to FIG. 1, a microprocessor 10 performing printer control processing is connected to a memory 12 consisting of a ROM and a RAM through an internal bus 17. The memory 12 stores in the ROM a control program for controlling the overall operation of the printer and an address table T1 and a buzzer data table T2 shown in FIGS. 2 and 3, respectively. The memory 12 also stores the calculation and discrimination results in the RAM.

The microprocessor 10 is connected to a buzzer unit 15 and a manual input unit 16 through an I/O port 13. The microprocessor 10 is also connected to a host apparatus such as a host computer through the I/O port 13 and an interface control circuit 14 constituting a receiver together with the I/O port 13.

The address table T1 and the buzzer data table T2 are stored in the data memory area of the memory 12, as shown in FIGS. 2 and 3, respectively. Address data representing address DT0 of the buzzer data table T2 is stored at a start address TA of the address table T1. Address data representing address DT1 of the buzzer data table T2 is stored at address TA+1. In this manner, address data representing addresses DT0, DT1, DT2, DT3, ... DTn of the buzzer data table T2 are stored at addresses TA, TA+1, ... TA+n+1 of the address table T1, respectively.

Buzzer sound data for starting and stopping the buzzer sound is stored at each address of the buzzer data table T2. The table T2 constitutes a buzzer tone memory table. As shown in FIG. 3, data of "1" is stored at address DT0 of the buzzer data table T2, data of "4" is stored at address DT0+1, and data of "0" is stored at address DT0+2. These data constitute the first buzzer sound data. Similarly, data of "1", "2", "1", "2", "1", "2" and "0" are stored at address DT1, DT1+1, DT1+2, DT1+3, DT1+4, DT1+5 and DT1+6 of the buzzer data table T2, respectively. These data constitute the second buzzer sound data. The address is sequentially incremented from DT2 to DTn, and each buzzer sound data ended with logic "0" constitute one group, so that the third to (n+1)th buzzer sound data are stored in the memory area of the buzzer data table T2. By using the data stored in the address table T1 and the buzzer data table T2, different buzzer sounds corresponding to control signal codes BSL1 to BSL3 (to be described later), letters A to Z and numbers 0 to 9 are generated.

The control signal codes BSL1 to BSL3 are predetermined between the host apparatus and the printer. When a code is transmitted from the host apparatus to the printer, the printer decodes the code to generate the corresponding buzzer sound. The control signal codes BSL1 to BSL3 are used to indicate the end of printing, interruption of printing, and generation of an error, respectively.

The operation of the printer having the above arrangement will be described with reference to the flow chart of FIG. 4.

The coded data received from the host apparatus through the interface control circuit 14 and the I/O port 13 is stored in an accumulator A in the microprocessor 10 (step S1). The microprocessor 10 decodes to check in steps S2 to S4 whether or not the content of the accumulator A corresponds to one of the control signal codes BSL1 to BSL3. When the decoded content represents the control signal code BSL1, the decoding result display data of "1" is stored in an index register IR of the microprocessor 10 (step S5). However, when the decoded content represents the code BSL2 or BSL3, data of "2" or "3" is stored as the decoding result display data in the index register IR (step S6 or S7). The content of the index register IR is initially set to be "0". In steps S2 to S4, if the coded signal from the host apparatus is discriminated not to represent any of the control signal codes BSL1 to BSL3, the flow advances to step S8. In step S8, the microprocessor 10 checks whether or not the coded signal represents a buzzer code BEL for requesting operation of the buzzer. If YES in step S8, the flow advances to step S12.

However, if NO in step S8, the microprocessor 10 checks in step S9 whether or not a mode flag MF is set at logic "1". In this manner, the microprocessor 10 serves as a data discriminator. The mode flag MF is reset to logic "0" in the initial state and is updated to logic "1" in response to a specific command supplied from the host apparatus to the microprocessor 10. When the mode flag MF is set at logic "0", the general printer control routine is executed (step S10), and normal printing is performed. However, when the mode flag MF is set at logic "1" in response to the specific command, the microprocessor 10 subtracts a predetermined number "y" from the content of the accumulator A. A resultant value is stored as address data in the index register IR, that is, code translation is performed (step S11). For example, if the code stored in the accumulator A is character code 65 which represents letter "A", the value "y" is subtracted from the code 65. If y=61 is established, data of "4" is stored in the index register IR. In this manner, an updated code obtained by subtracting the value "y" from the received character code among the codes for letters A to Z and numbers 0 to 9 is stored in the index register IR. As a result, the content of the index register IR is set to be "0" in the initial state. When one of the control signal codes BSL1 to BSL3 is entered, a corresponding one of the data "1" to "3" is stored in the index register IR. When the mode flag MF is set at logic "1" and a character code is received, a new code having a value of 4 or more so as to correspond to the received character code is stored in the index register IR. The microprocessor 10 adds the content of the index register IR to the content DT0 of the start address TA of the address table T1. The address data sum is fetched by the microprocessor 10 and stored in the address register ADR of the buzzer data table T2 so as to access the buzzer sound data (step S12). When the content of the index register IR is set to be "0", the address DT0 of the buzzer data table T2 is stored as the sum in the address register ADR in accordance with the address TA of the address table T1. When the content of the index register IR is set to be "1", the address DT1 of the buzzer data table T2 is stored in the address register ADR. Similarly, the addresses DT2 to DTn of the buzzer data table T2 are sequentially stored in the address register ADR in accordance with the contents of the index register IR. The microprocessor 10 sets a buzzer ON flag BONF as an ON/OFF control parameter of the buzzer unit 15 to be "0" (step S12).

The microprocessor 10 checks in step S13 whether or not the buzzer ON flag BONF is set at logic "1". Since the flag BONF is initially set at logic "0", the buzzer unit 15 is deenergized so as not to produce a buzzer sound (step 14). The microprocessor 10 serves as a buzzer sound data readout means to cause the content of the buzzer data table T1 addressed by the storage content TA+IR of the address register ADR to be stored in the accumulator A (step S16). This is exemplified by the case of the buzzer data data table T2 shown in FIG. 3. Since the addresses DT0 to DTn are initially stored in the address register ADR, all logic "1s" are stored in the corresponding address and data of "1" is stored in the accumulator A.

The microprocessor 10 checks in step S17 whether or not the content of the accumulator A is set to be "0". If NO in step S17, the content of the accumulator A is multiplied by n. The timer is set for the predetermined count time corresponding to the multiplied product and is started (step S18). The parameter n is entered at the manual input unit 16. By changing the parameter n, the duration and interval of the buzzer sounds can be changed in a manner to be described later. When the timer T is stopped (step S19), "1" is added to the content of the address register ADR, and at the same time the buzzer ON flag BONF is inverted (step S20). The operations after step S13 are repeated. As a result, since the buzzer ON flag BONF is set at logic "1", the buzzer unit 15 is energized to produce the buzzer sound (steps S13 and S15). The content of the address of the buzzer data table T2 accessed by the storage content of the address register ADR is stored in the accumulator A (step S16). In the current loop, since the storage content of the address register ADR is incremented by one as compared with that of the immediately preceding loop, the address of the buzzer data table T2 accessed by the current loop is incremented by one. For example, when the previous address is given as DT0 (i.e., the content of the index register IR is set to be "0"), the data of "4" at the address DT0+1 is stored in the accumulator A. However, when the previous address is given as DT1 (i.e., the content of the index register IR is set to be "1"), data of "2" at address DT1+1 is stored in the accumulator A.

In this manner, when the content of the accumulator A is not set to be "0", a value obtained by multiplying the content of the accumulator A by n is set in the timer T, and the microprocessor 10 waits until the predetermined period of time set in the timer T has elapsed (steps S17 and S18). During the predetermined period of time, the buzzer continuously produces the sounds. When the predetermined period of time of the timer T has elapsed, the content of the address register ADR is incremented by one. The microprocessor 10 inverts the buzzer ON flag BONF (step S20), and the operations after step S13 are repeated again. The buzzer unit 15 is kept off for a period of time corresponding to the buzzer sound data of a given loop. The operations after step S13 are repeated until the content of the accumulator A is "0".

The contents of the addresses of the buzzer data table T2 are sequentially read out in response to address updating from any of the addresses DT0 to DTn of the buzzer data table T2 which are read out from the address table T1 in response to the content of the index register IR, thereby controlling the ON/OFF operation of the buzzer unit 15 and its interval. When data of "0" is read out from the buzzer data table T2, the ON operation of the buzzer for one pattern is completed. In other words, when the buzzer code BEL is received while the content of the index register IR is set to be "0", the address TA of the address table T1 is selected to access the address DT0 of the buzzer data table T2. The buzzer unit 15 is not operated for one unit time. Subsequently, the address DT0+1 is selected to operate the buzzer unit 15 for 4 unit times. The content at the address DT0+2 is set to be "0", so that this buzzer operation is completed. When the buzzer code BEL is received while the control signal code BSL1 is received and the content of the index register IR is set to be "1", the address DT1 of the buzzer data table T2 is selected. In this case, the buzzer unit 15 is stopped for one unit time, operated for two unit times, stopped for one unit time, operated for two unit times, stopped for one unit time, operated for two unit times and stopped to complete this cycle. Similarly, whenever a character code is received while the mode flag MF is set at logic "1" so as to indicate a specific command received from tee host apparatus, intermittent buzzer sounds corresponding to the received character code are generated.

When the contents of the buzzer data table T2 are preset, as shown in FIG. 5, so as to obtain buzzer sounds which are identical with Morse code signals, Morse code signal communication can be performed. Referring to FIG. 5, buzzer sound data respectively corresponding to Morse signals ·-, -··-, -·- representing letters A, B and C for example are stored at addresses DT4 to DT4+3, DT5 to DT5+7, and DT6 to DT6+7.

In the above embodiment, three control signal codes BSL1 to BSL3 are used to detect the end of printing, interruption of printing and generation of an error, respectively. However, the contents of the control signal codes are not limited to these, but can be extended to various acknowledgement contents in accordance with a variety of applications of the computer terminal device which adapts the present invention.

In the above embodiment, the control signal codes BSL1 to BSL3 are provided However, instead, predetermined character codes or combinations of character codes may be used as control signals for representing the end of printing, interruption of printing or the like. The duration of the buzzer sound can be changed in accordance with a change in parameter n entered at the manual input unit 16. The buzzer duration can be arbitrarily changed for a specific application purpose.

The above embodiment is exemplified by a printer. However, as shown in FIG. 1, the present invention may be applied to a display unit D such as a CRT.

In the above embodiment, only one tone of buzzer sound is used. However, a plurality of buzzer sounds at different frequencies can be used. The tone of the buzzer sounds can be changed by using a speech synthesis apparatus for example.

According to the present invention, the following advantages are obtained:

(i) Since different types of buzzer sounds can be generated from a computer terminal device such as a printer or a CRT, the buzzer instruction supplied from the host apparatus can be selected to inform the operator of the end of printing, interruption of printing or generation of an error.

(ii) When the buzzer sounds have one-to-one correspondence with the characters, these sounds can be used as Morse code signals.

What is claimed is:

1. A computer terminal printer device for generating different types of buzzer sounds indicating printer status information such as end of printing, interruption of printing, generation of errors, etc., in response to control signals from a remote host computer, said computer terminal printer device comprising:
  buzzer sound data memory means for storing a plurality of buzzer sound data which are obtained by converting a plurality of intermittent buzzer sounds to numeric values;
  interfacing means for interfacing control signals between said terminal printer device and said host computer, said interfacing means including:
  (a) receiving means for receiving coded data from said host computer;
  (b) data discriminating means for decoding the coded data received by said receiving means; and
  (c) an index register for storing a decoding result of said data discriminating means;
  buzzer sound readout means for reading out the buzzer sound data from said buzzer sound data memory means so as to correspond to the control signals transmitted by said host computer;
  a buzzer unit for producing intermittent buzzer sounds corresponding to the readout buzzer sound data; and
  processor means at said terminal printer device for controlling said interfacing means.

2. A device according to claim 1, wherein the coded data received by said receiving means includes at least one character code representing a character, the intermittent buzzer sounds being produced by said buzzer unit so as to correspond to the character upon reception of the character code.

3. A device according to claim 2, wherein the buzzer sounds of the buzzer sound data corresponding to the character code constitute Morse code sounds.

4. A computer terminal printer device as set forth in claim 1, wherein said buzzer sound data memory means comprises:
  first buzzer sound data storage means for storing first buzzer sound data indicative of a time period during which said buzzer sounds are produced;
  second buzzer sound data storage means for storing second buzzer sound data indicative of a time period during which said buzzer sounds are not produced; and
  means for reading out said first and second buzzer sound data, alternately, from said buzzer sound memory means in response to said control signals from said remote host computer.

* * * * *